(12) United States Patent
Chowdhury et al.

(10) Patent No.: US 6,742,282 B2
(45) Date of Patent: Jun. 1, 2004

(54) DETECTING LIQUID DRY CONDITIONS FOR LIQUEFIED COMPRESSED GASES

(75) Inventors: Naser Mahmud Chowdhury, Orefield, PA (US); Sukla Chandra, Calcutta (IN); Warren Matthew Janigian, Weimouth, MA (US)

(73) Assignee: Air-Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/300,477

(22) Filed: Nov. 20, 2002

(65) Prior Publication Data

US 2003/0084589 A1 May 8, 2003

Related U.S. Application Data

(60) Division of application No. 09/138,498, filed on Aug. 24, 1998, now Pat. No. 6,134,805, which is a division of application No. 09/694,199, filed on Oct. 23, 2000, and a continuation-in-part of application No. 09/816,293, filed on Mar. 23, 2001.

(51) Int. Cl.$^7$ .............................. F26B 5/04; F17C 7/04
(52) U.S. Cl. ........................... 34/403; 34/402; 62/48.1; 62/50.2
(58) Field of Search .................... 34/402, 403, 405, 34/92, 559, 50.1, 48.1, 50.2, 530, 371

(56) References Cited

U.S. PATENT DOCUMENTS

| | | | |
|---|---|---|---|
| 4,352,642 A | * 10/1982 | Murayama et al. | 417/312 |
| 5,092,170 A | 3/1992 | Honstvet et al. | 73/295 |
| 5,209,115 A | 5/1993 | Bond | 73/295 |
| 5,359,787 A | 11/1994 | Mostowy, Jr. et al. | 34/343 |
| 6,058,714 A | * 5/2000 | Takasugi | 62/50.1 |
| 6,085,548 A | * 7/2000 | Chowdhury et al. | 62/617 |
| 6,112,528 A | * 9/2000 | Rigby | 62/48.1 |
| 6,134,805 A | 10/2000 | Chowdhury et al. | 34/403 |
| 6,220,051 B1 | * 4/2001 | Takasugi | 62/530 |

* cited by examiner

Primary Examiner—Ira S. Lazarus
Assistant Examiner—Kenneth B. Rinehart
(74) Attorney, Agent, or Firm—Geoffrey L. Chase

(57) ABSTRACT

A method and an apparatus are disclosed for detecting an occurrence of a liquid dry condition in a container containing a liquefied compressed gas while the gaseous phase of the liquefied compressed gas is being removed from the container over time. The apparatus includes a first sensor, a second sensor, and a computer, preferably a programmed logic controller (PLC). The first sensor senses temperature (T) inside the container and provides a signal indicative thereof. The second sensor senses pressure (P) inside the container and provides a signal indicative thereof. The computer receives signals from the first and second sensors, and determines the rates of change in the pressure (dP/dt) and the temperature (dT/dt) inside the container over time. The computer identifies an occurrence of a sudden increase in the rate of change in the temperature (dT/dt) inside the container and a substantial simultaneous occurrence of a sudden decrease in the rate of change in the pressure (dP/dt) inside the container, said substantially simultaneous occurrences indicating an occurrence of a liquid dry condition in the container. The preferred embodiment includes a third sensor for sensing ambient temperature ($T_a$) and for providing a signal indicative thereof. The computer receives a signal from the third sensor and accounts for a change in the ambient temperature in determining the rate of change in the temperature (dT/dt) inside the container over time.

12 Claims, 5 Drawing Sheets

DETECTING LIQUID DRY CONDITIONS FOR LIQUEFIED COMPRESSED GASES

CROSS-REFERENCE TO RELATED APPLICATIONS

This application is a division of U.S. application Ser. No. 09/138,498 filed Aug. 24, 1998, now U.S. Pat. No. 6,134, 805; a further division of divisional application Ser. No. 09/694,199 filed Oct. 23, 2000 and a continuation of divisional application Ser. No. 09/816,293 filed Mar. 23, 2001.

STATEMENT REGARDING FEDERALLY SPONSORED RESEARCH OR DEVELOPMENT

Not applicable.

BACKGROUND OF THE INVENTION

The present invention relates to a method and an apparatus for delivering a liquefied compressed gas from a tube trailer or other supply source to a use point, such as a semiconductor fabrication tool or facility, and in particular to a method and an apparatus for detecting the occurrence of a liquid dry condition.

Reference is made to use of the invention for detection of an occurrence of a liquid dry condition in high-pressure tubes of hydrogen chloride (HCl). (The tubes are elongated cylinders which are stacked one upon the other on a trailer for transportation of chemicals and gases, as is well known in the industrial gas industry.) However, the invention can be used in connection with other types of liquefied compressed gases and other types of containers.

High-purity HCl is used for certain semiconductor processes, such as silicon epitaxial deposition. Bulk HCl is delivered to semiconductor customers in tube trailers, which include multiple tubes typically rated to 1800 psig. At 70° F., HCl exists as a compressed liquefied gas under its own vapor pressure of 629 psig. Customers draw the vapor from each tube to feed their specific process applications, such that one tube serves as the source of gas until it is considered to be empty, when a crossover panel then changes (or crosses over) the source to the next available tube of gas.

It is desirable to determine when each HCl tube is near "empty" for several reasons. The customer desires to use as much HCl from each tube as possible, since they are billed per full trailer of product delivered, not by the amount of product that is used. It is undesirable, however, to draw product from tubes that are sufficiently empty that the product exists only in a gaseous phase, commonly referred to as a liquid dry condition. The liquid dry condition causes an increase in the levels of impurities of lower volatility in the gas stream, including an increase in moisture level, which causes corrosion. This could result in lower semiconductor yields.

A liquid dry point occurs when a pressurized liquefied compressed gas, such as HCl, in a container (such as a tube) is slowly vaporized for saturated gaseous supply, as follows. When substantial amounts of the HCl exist in the liquid phase, the pressure of the system remains relatively stable during the release and delivery of the saturated gaseous HCl because the liquid portion vaporizes with the input of heat from the environment. Eventually a physical state occurs where all of the liquid has been vaporized and the remaining HCl exists in an entirely unsaturated, gaseous phase. At precisely this moment, a liquid dry condition has occurred, wherein the pressure of the container decays rapidly thereafter.

Moisture and volatile metallic compounds can typically increase significantly after the liquid dry point is reached in liquefied compressed gas such as HCl. When a two phase system exists in a container (such as tube trailer), a vapor liquid equilibrium is maintained. Contaminants such as moisture and volatile metals have very low partition coefficient and concentrate more in the liquid phase leaving the vapor phase much cleaner. (Partition coefficient is the ratio of the concentration of a volatile component in the gaseous phase to its concentration in the liquid phase when the system is in vapor liquid equilibrium.) These contaminants get more concentrated as HCl preferentially vaporizes as ultra-pure product during transfer and delivery to the use point. Upon reaching the liquid dry point, due to the absence of the liquid phase, moisture and volatile metals are free to pass with the delivered gas. Therefore, when liquid dry point is reached, higher than normal levels of moisture or any volatile metals are experienced in the delivery of final gaseous product from the source of supply (such as tube trailers). It is therefore desirable to detect the approach or obtaining the liquid dry condition.

Devices such as mass flow meters or mass flow totalizers have been unreliable in HCl service and therefore cannot be used to detect liquid dry conditions based on mass balance calculations. Typically, a weigh scale is used to identify when a tube is approaching a liquid dry condition. However, this usually requires leaving a nominal liquid heel in the tube, making it less than an optimal solution. Also, the purchase and installation of a scale requires a large capital investment.

An alternate method of identifying when a tube is approaching a liquid dry condition is disclosed in U.S. Pat. No. 5,359,787 (Mostowy, et al.). Sensors, such as thermocouples and pressure transducers, are provided for the source supply (e.g., a tube trailer) and the ambient temperature conditions. The ambient temperature at the source supply is sensed, the temperature of the chemical from the source supply is sensed, and the relative change in pressure over selected time intervals is sensed and transmitted to a digital computational controller. These values are compared against preset values for ambient temperature, source of supply temperature and pressure indicative of the liquid dry point (gas phase), and when the sensed values exceed the prescribed preset values which indicate the liquid dry point is reached, the controller provides an appropriate alarm signal.

U.S. Pat. No. 5,359,787 teaches that the liquid dry point also can be calculated by determining and inputting to the digital computational controller the volume of the tube trailer, the weight of the trailer during transfer of the liquefied compressed gas, and the ambient temperature at the tube trailer, as well as the temperature of the chemical leaving the tube trailer and entering the delivery conduit. These values are compared to preset values already input into the controller which represent approach to substantially gas phase of the chemical (meaning that at least some small amount of chemical is still in the liquid phase). When the sensed values meet or exceed the preset values so as to indicate the approach to the liquid dry point (substantially a gas phase), the system generates an alarm signal.

Neither of the methods disclosed in U.S. Pat. No. 5,359,787 for identifying or determining the liquid dry point works as well as the present invention, which provides a more exact method for detecting the occurrence of a liquid dry condition using a more quantitative approach.

It is desired to have a more cost effective, reliable method of detecting the occurrence of a liquid dry condition in a container of liquefied compressed gas, such as HCl.

It is further desired to have a more cost effective, reliable method of delivering a high-purity industrial chemical in gaseous phase from a transport vehicle having multiple tubes which contain the chemical in a liquefied compressed gas phase. It also is desired to have an improved transport vehicle for delivering a high-purity industrial chemical in gas phase.

It is still further desired to direct the changing (or crossover) of tubes in a tube trailer or other bulk delivery system in an optimal manner.

BRIEF SUMMARY OF THE INVENTION

The present invention is a method and an apparatus for detecting an occurrence of a liquid dry condition in a container containing liquefied compressed gas. The present invention also includes a method and an apparatus for directing a crossover to a second supply of liquefied compressed gas upon the occurrence of a liquid dry condition in the container. In addition, the present invention includes an improvement to a transport vehicle (e.g., a tube trailer) for delivering a high-purity industrial liquefied compressed gas in gaseous phase and a method of delivering the high-purity industrial chemical in gaseous phase from the transport vehicle.

In a first embodiment, the method of detecting an occurrence of a liquid dry condition in a container containing a liquefied compressed gas while the gaseous phase of the liquefied compressed gas is being removed from the container over time comprises multiple steps. The first step is to measure the pressure (P) inside the container over time. The next step is to measure the temperature (T) inside the container over time. The third step is to determine a rate of change in the pressure (dP/dt) inside the container over time. The next step is to determine a rate of change in the temperature (dT/dt) inside the container over time. The final step is to identify an occurrence of a sudden increase in the rate of change in the temperature (dT/dt) inside the container and a substantially simultaneous occurrence of a sudden decrease in the rate of change in the pressure (dP/dt) inside the container, said substantially simultaneous occurrences indicating an occurrence of a liquid dry condition in the container.

In a second embodiment, the method of detecting the occurrence of a liquid dry condition includes two additional steps. The first additional step is to monitor the ambient temperature ($T_a$). The second additional step is to account for a change in the ambient temperature in determining the rate of change in the temperature (dT/dt) inside the container over time.

A third embodiment of the invention is an apparatus for detecting an occurrence of a liquid dry condition in a container (22 or 24) containing a liquefied compressed gas while the gaseous phase of the liquefied compressed gas is being removed from the container over time. The apparatus includes a first sensor (12), a second sensor (14) and a computer (16). The first sensor senses temperature (T) inside the container and provides a signal indicative thereof. The second sensor senses pressure (P) inside the container and provides a signal indicative thereof. The computer receives signals from the first and second sensors, and determines rates of change in the pressure (dP/dt) and the temperature (dT/dt) inside the container over time. The computer also identifies an occurrence of a sudden increase in the rate of change in the temperature (dT/dt) inside the container and a substantially simultaneous occurrence of a sudden decrease in the rate of change in the pressure (dP/dt) inside the container, said substantially simultaneous occurrences indicating an occurrence of a liquid dry condition in the container.

In the preferred embodiment, the computer (16) is a programmed logic controller (PLC). The first sensor (12) preferably is a thermocouple, and the second sensor (14) preferably is a pressure transducer. The apparatus also may include an alarm (34) to report the occurrence of a liquid dry condition.

In a fourth embodiment, the apparatus also includes a third sensor (20) for sensing ambient temperature (Ta) and for providing a signal indicative thereof. The computer receives the signal from the third sensor and accounts for a change in the ambient temperature in determining the rate of change in the temperature (dT/dt) inside the container overtime.

In one variation of this embodiment, the computer accounts for a change in the ambient temperature ($T_a$) by a method comprising the following steps: (a) receiving the signals from the first and second sensors indicating the temperature (T) and the pressure (P) inside the container; (b) calculating a change in pressure inside the container over time $\Delta P_t$, a change in temperature inside the container over time $\Delta T_t$, and a change in ambient temperature over time $\Delta T_a$; (c) calculating $$\frac{\Delta P_t}{\Delta t_t}$$

and $$\frac{\Delta T_t}{\Delta t_t},$$

wherein $\Delta t_t$ is an interval of time; (d) calculating $$\frac{\Delta P_t}{\Delta T_t};$$

(e) comparing the value of $$\frac{\Delta P_t}{\Delta T_t}$$

with a first preset range of values referring to normal running conditions; (f) determining if the $$\frac{\Delta P_t}{\Delta T_t}$$

value is out of the first preset range of values; (g) if the $$\frac{\Delta P_t}{\Delta T_t}$$

value is out of the first preset range of values, calculating $$\frac{\Delta T_t}{\Delta T_a}$$

and $$\frac{\Delta P_t}{\Delta T_a};$$

(h) comparing the calculated values of $$\frac{\Delta T_t}{\Delta T_a}$$

and $$\frac{\Delta P_t}{\Delta T_a}$$

with a second preset range of values for normal running conditions; (i) if the calculated values of $$\frac{\Delta T_t}{\Delta T_a}$$

and $$\frac{\Delta P_t}{\Delta T_a}$$

are out of the second-preset range of values, repeating steps (a) through (i).

In a fifth embodiment, the apparatus includes a data logging device for receiving the signals from the first and second sensor, and for converting the signals to the measurements of pressure (P) and temperature (T) inside the container at specific points in time. The data logging device also determines the rates of change in the pressure (dP/dT) and the temperature (dT/dt) inside the container over time, and records the measurements of pressure (P), temperature (T), and rates of change in the pressure (dP/dt) and the temperature (dT/dt) inside the container as a function of time. The data logging device also may receive a signal from the third sensor, convert that signal to a measurement of ambient temperature ($T_a$) at specific points in time, and record the ambient temperature ($T_a$) as a function of time.

A sixth embodiment of the invention is a method of directing a crossover to a second supply (24) of liquefied compressed gas upon an occurrence of a liquid dry condition in a container (22) containing a first supply of liquefied compressed gas while the gaseous phase of the first supply of the liquefied compressed gas is being received from the container over time. The method includes multiple steps. The first step is to measure the pressure (P) inside the container over time. The next step is to measure the temperature (T) inside the container over time. The third step is to determine a rate of change in the pressure (dP/dt) inside the container over time. The fourth step is to determine a rate of change in the temperature (dT/dt) inside the container over time. The fifth step is to identify an occurrence of a sudden increase in the rate of change in the temperature (dT/dt) inside the container and a substantially simultaneous occurrence of a sudden decrease in the rate of change in the pressure (dP/dt) inside the container, said substantially simultaneous occurrences indicating an occurrence of a liquid dry condition in the container. The final step is to actuate a crossover to the second supply of liquefied compressed gas upon identifying the occurrence of a sudden increase in the rate of change in the temperature (dT/dt) inside the container and a substantially simultaneous occurrence of a sudden decrease in the rate of change in the pressure (dP/dt) inside the container.

A seventh embodiment of the invention is a method of directing a crossover to the second supply of liquefied compressed gas which includes two additional steps. The first additional step is to monitor the ambient temperature ($T_a$). The second additional step is to account for a change in the ambient temperature in determining the rate of change in the temperature (dT/dt) inside the container over time.

In one variation of this embodiment, the second additional step (i.e., accounting for a change in the ambient temperature) comprises the following sub-steps:

(a) calculating a change in pressure inside the container over time $\Delta P_t$, a change in temperature inside the container over time $\Delta T_t$, and a change in ambient temperature over time $\Delta T_a$; (b) calculating $$\frac{\Delta P_t}{\Delta t_t}$$

and $$\frac{\Delta T_t}{\Delta t_t},$$

wherein $\Delta t_t$ is an interval of time; (c) calculating $$\frac{\Delta P_t}{\Delta T_t};$$

(d) comparing the value of $$\frac{\Delta P_t}{\Delta T_t}$$

with a first preset range of values referring to normal running conditions; (e) determining if the $$\frac{\Delta P_t}{\Delta T_t}$$

value is out of the first preset range of values; (f) if the $$\frac{\Delta P_t}{\Delta T_t}$$

value is out of the first preset range of values, calculating $$\frac{\Delta T_t}{\Delta T_a}$$

and $$\frac{\Delta P_t}{\Delta T_a};$$

(g) comparing the calculated values of $$\frac{\Delta T_t}{\Delta T_a}$$

and $$\frac{\Delta P_t}{\Delta T_a}$$

with a second preset range of values for normal running conditions; (h) if the calculated values of $$\frac{\Delta T_t}{\Delta T_a}$$

and $$\frac{\Delta P_t}{\Delta T_a}$$

are out of the second preset range of values, repeating sub-steps (a) through (h).

An eighth embodiment is an apparatus for directing a crossover to a second supply of liquefied compressed gas upon an occurrence of a liquid dry condition in the container containing a first supply of liquefied compressed gas while the gaseous phase of the first supply of the liquefied compressed gas is being removed from the container over time. The apparatus includes the following: (1) means (14) for measuring the pressure (P) inside the container over time; (2) means (12) for measuring the temperature (T) inside the container over time; (3) means (16) for determining a rate of change in the pressure (dP/dt) inside the container over time; (4) means (16) for determining a rate of change in the temperature (dT/dt) inside the container over time; (5) means (16) for identifying an occurrence of a sudden increase in the rate of change in the temperature (dT/dt) inside the container and a substantially simultaneous occurrence of a sudden decrease in the rate of change in the pressure (dP/dt) inside the container, said substantially simultaneous occurrences indicating an occurrence of a liquid dry condition in the container; and (6) means (26, 28, 30 and 32) for actuating a crossover to the second supply of liquefied compressed gas upon identifying an occurrence of a sudden increase in the rate of change in the temperature (dT/dt) inside the container and a substantially simultaneous occurrence of a sudden decrease in the rate of change in the pressure (dP/dt) inside the container.

In a ninth embodiment, the apparatus for directing a crossover to a second supply of liquefied compressed gas upon an occurrence of a liquid dry condition in the container containing a first supply of liquefied compressed gas also includes: (1) means for monitoring the ambient temperature ($T_a$); and (2) means for accounting for a change in the ambient temperature ($T_a$) in determining the rate of change in the temperature (dT/dt) inside the container over time.

A tenth embodiment is a method of delivering a high-purity industrial liquefied compressed gas in gaseous phase from a transport vehicle having multiple tubes which contain the liquefied compressed gas in gaseous phase. The method includes multiple steps, as follows: (a) connecting a first tube (22) of the vehicle (18) to a delivery system (36); (b) discharging the liquefied compressed gas in gaseous phase over time through the delivery system; (C) detecting the occurrence of a liquid dry condition in the first tube (22); (d) automatically disconnecting (30) the first tube from the delivery system upon said detection of the liquid dry condition; (e) connecting (32) a next tube (24) of the vehicle to the delivery system; and (f) repeating steps (b) through (e) until the liquefied compressed gas has been discharged from all tubes of the vehicle.

In the preferred embodiment, the step of detecting the occurrence of liquid dry condition in the tube [i.e., step (c)] comprises multiple sub-steps. The first sub-step is to measure the pressure (P) inside the tube over time. The next sub-step is to measure the temperature (T) inside the tube over time. The third sub-step is to determine a rate of change in the pressure (dP/dt) inside the tube over time. The fourth sub-step is to determine a rate of change in the temperature (dT/dt) inside the tube over time. The final sub-step is to identify an occurrence of a sudden increase in the rate of change in the temperature (dT/dt) inside the tube and a substantially simultaneous occurrence of a sudden decrease in the rate of change in the pressure (dP/dt) inside the tube, said substantially simultaneous occurrences indicating an occurrence of a liquid dry condition in the tube.

An eleventh embodiment is an improvement to a transport vehicle (18) for delivering a high-purity industrial liquefied compressed gas in gaseous phase, the vehicle being of the type having multiple tubes (22, 24) which contain the liquefied compressed gas in gaseous phase. The improvement includes: (1) means (30) for connecting a first tube (22) of the vehicle (18) to a delivery system (36); (2) means (12, 14, 16) for discharging the liquefied compressed gas in gaseous phase over time through the delivery system; (3) means for detecting the occurrence of a liquid dry condition in the tube; (4) means (26) for automatically disconnecting the first tube (22) from the delivery system (36) upon said detection of the liquid dry condition; and (5) means (32) for connecting a next tube (24) of the vehicle (18) to the delivery system (36).

DETAILED DESCRIPTION OF THE INVENTION

The present invention teaches a method and an apparatus for detecting the liquid dry condition by monitoring the pressure and temperature inside each tube (container) of HCl (or other liquefied compressed gas) during the delivery life of each tube (container). By understanding the thermodynamic phenomena of a tube as it departs from a vapor liquid equilibrium and approaches a liquid dry condition, it can be ascertained when a tube of HCl has gone to a liquid dry condition.

Several process simulations were run with the objective of identifying detectable trends at the time that a container, such as a tube, runs liquid dry. The process was modeled under the assumption that the tube wall temperature was equal to the bulk temperature of the gas in the container.

Figure 1:
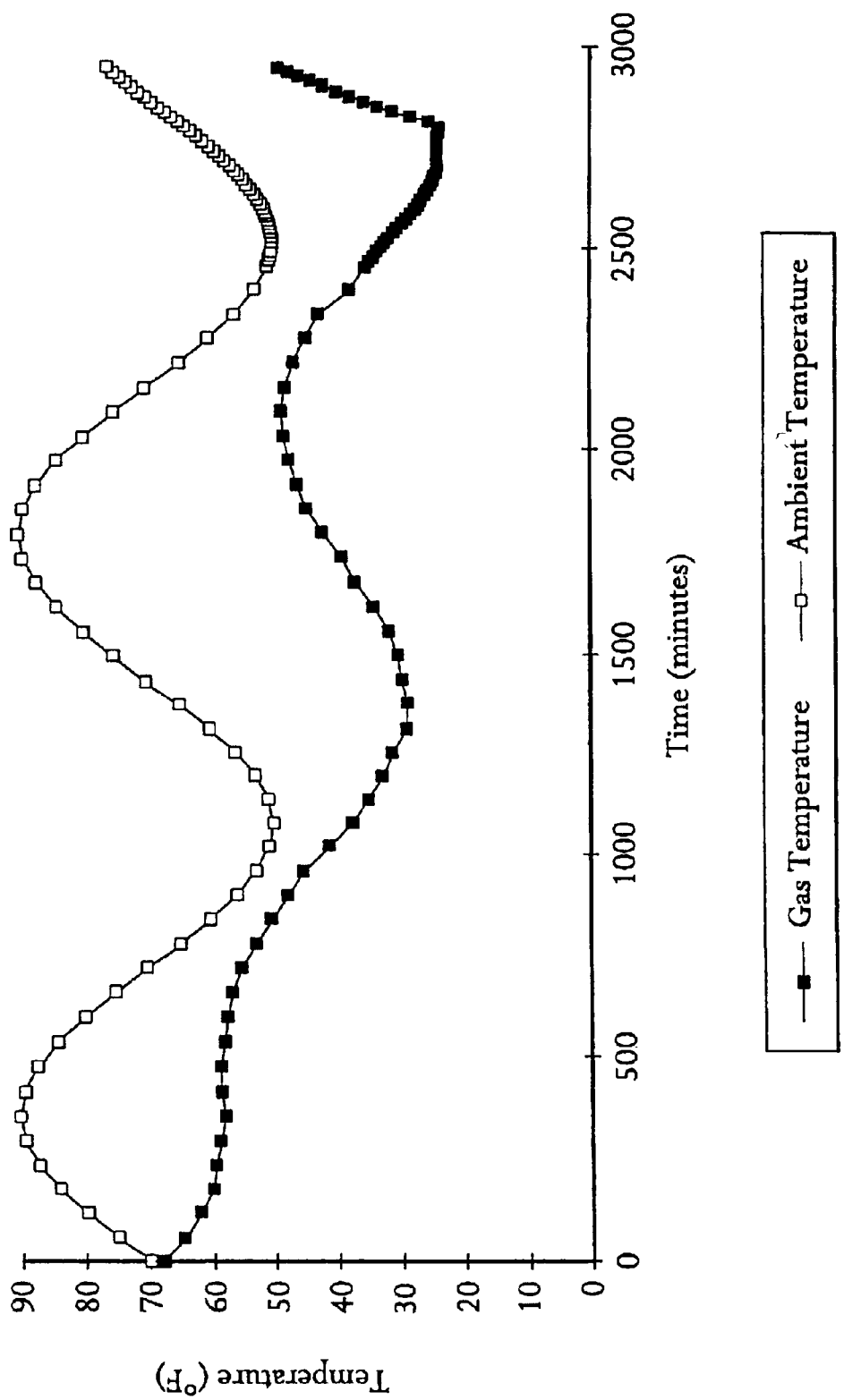
FIG. 1 is a graph showing gas temperature inside a tube of hydrogen chloride (HCl) and ambient temperature ($T_a$) over a 48-hour cycle during which HCl gas is withdrawn from the tube.
Figure 2:
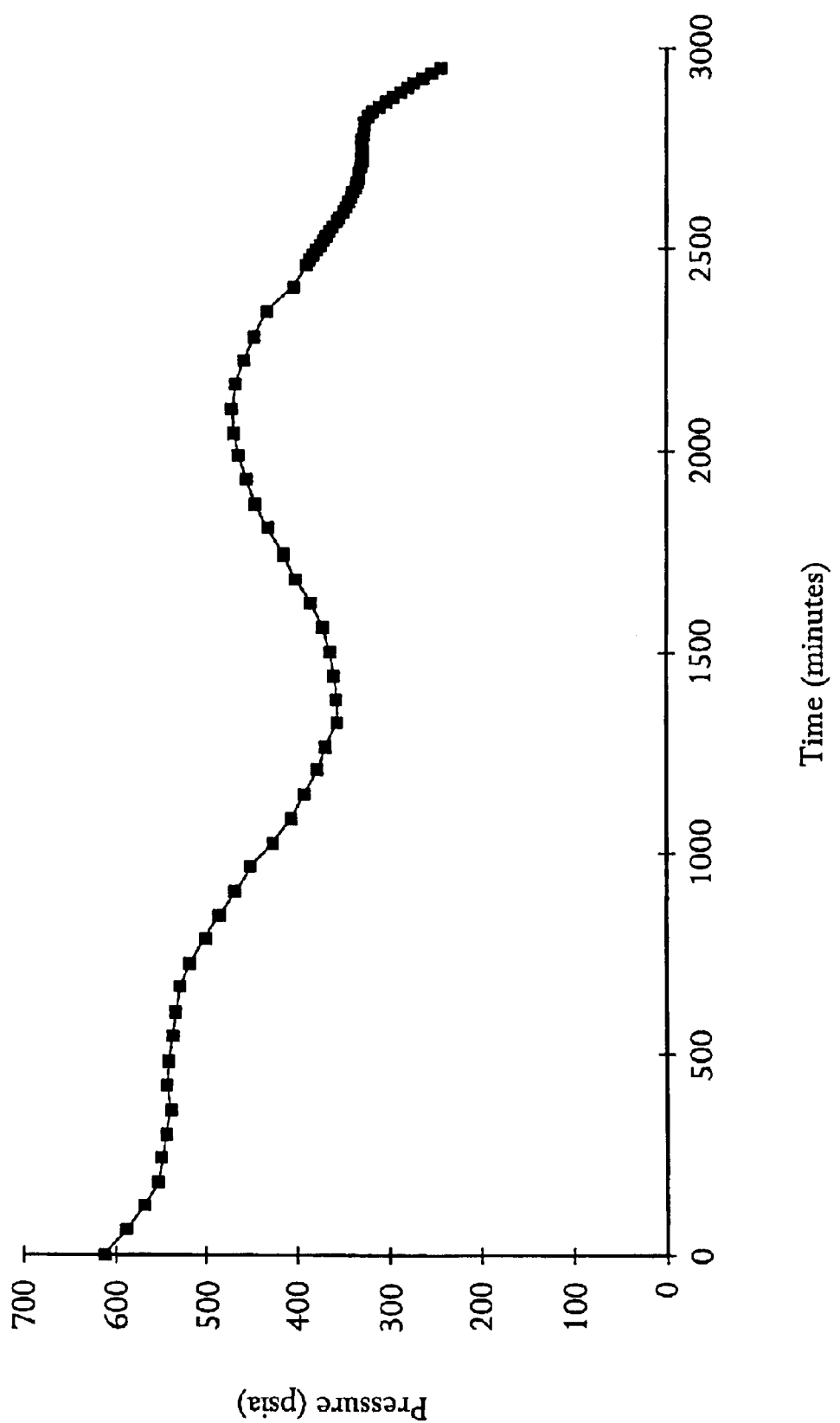
FIG. 2 is a graph showing the pressure (P) inside a tube of hydrogen chloride (HCl) over a 48-hour cycle as HCl gas is withdrawn from the tube.

When simulating a tube of HCl, such that the tube is initially full, with gas withdrawn at a high flow rate, and subject to a 24-hour variable ambient temperature cycle, the pressure (P) and temperature (T) of the system typically behave according to the graphs shown in FIGS. 1 and 2.

Initially, the container contents are assumed to be in vapor liquid equilibrium at a temperature (T) very close to the ambient temperature ($T_a$). As flow begins, both the temperature (T) and pressure (P) fall. If the ambient temperature ($T_a$) is relatively hot, both of these parameters (T, P) may tend to stabilize for a short period of time, as the environment is able to supply enough energy in the form of heat to balance the system. However, as nightfall arrives and the ambient temperature ($T_a$) cools, the system will once again begin to decline in temperature (T) and pressure (P). As the ambient temperature ($T_a$) begins to rise again, the system may see an increase in tube pressure (P) and temperature (T) due to the increased temperature difference (delta T). This rise will lag behind the ambient temperature rise in a somewhat predictable fashion.

The process simulation shows two common patterns that appear immediately after the system has gone liquid dry. First, the temperature (T) tends to change suddenly and dramatically in the direction of ambient temperature ($T_a$.). Since the tube temperature (T) is typically less than ambient, this effect shows up as a temperature increase. As the system continues to flow product, the bulk temperature (T) of the tube continues to approach ambient temperature ($T_a$), and if let run long enough, it will reach equilibrium with ambient conditions.

Immediately after running liquid dry, the system pressure (P) (the second measurable parameter) begins to drop faster than it had when in vapor liquid equilibrium. For high flow rates, this point is immediately obvious. For lower flow rates, this point is less obvious, but still detectable.

Figure 3:
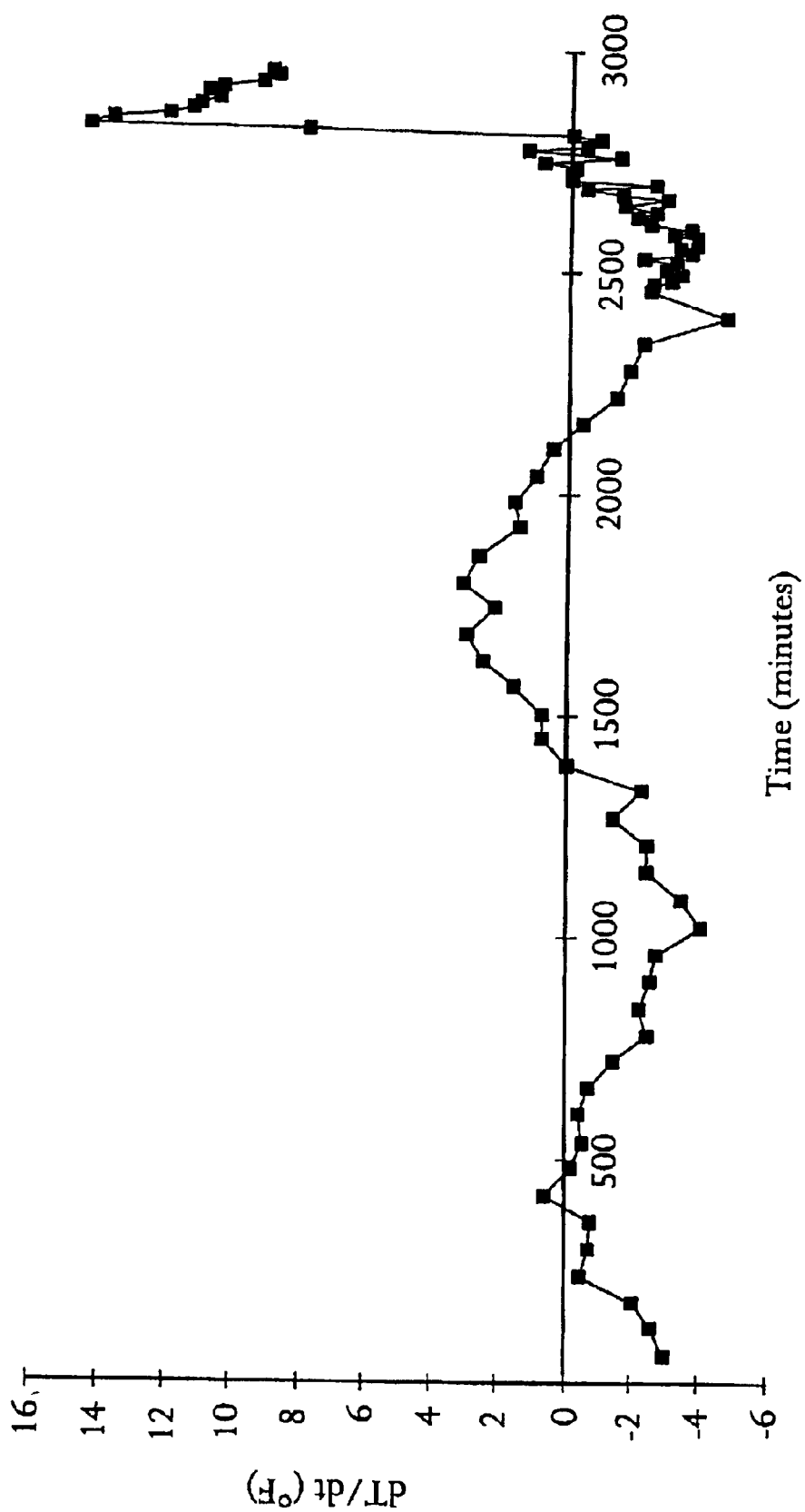
FIG. 3 is a graph showing the rate of change in temperature (dT/dt) inside a tube of hydrogen chloride (HCl) over a 48-hour cycle as HCl gas is withdrawn from the tube.
Figure 4:
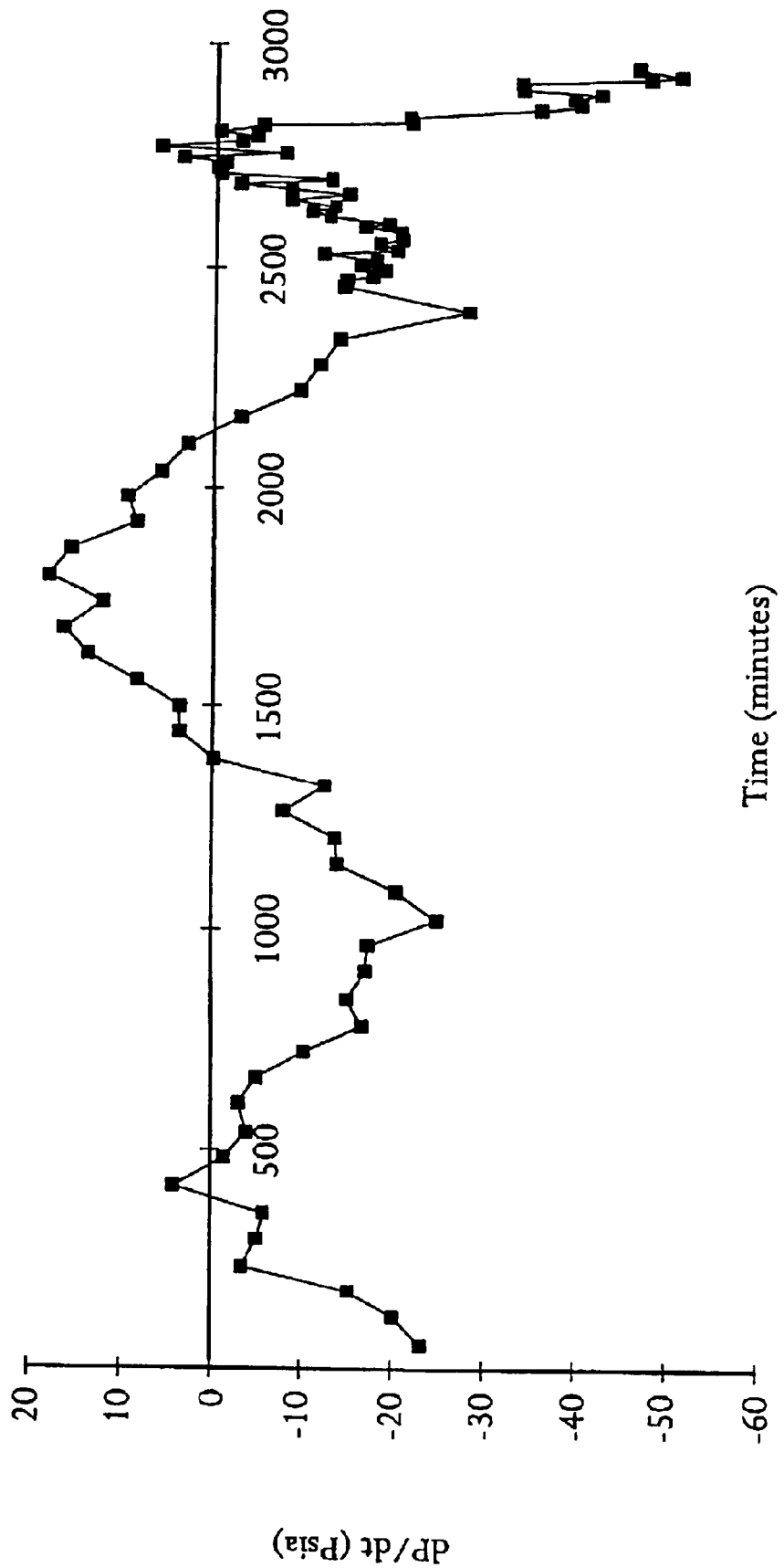
FIG. 4 is a graph showing the rate of change in pressure (dP/dt) inside a tube containing hydrogen chloride (HCl) over a 48-hour cycle as HCl gas is withdrawn from the tube.
Figure 5:
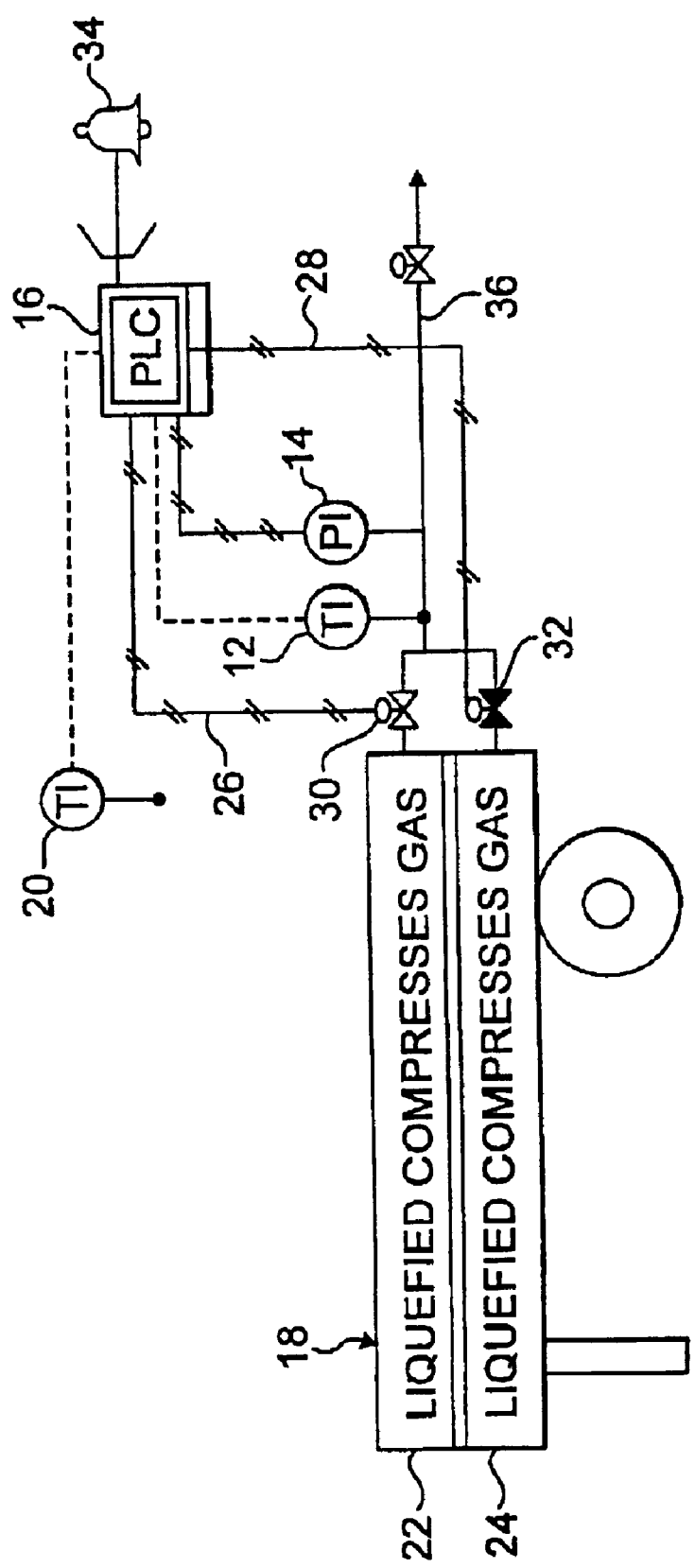
FIG. 5 is a schematic drawing of a preferred embodiment of the apparatus of the present invention.

One way to determine when an HCl tube runs liquid dry more exactly is to look at the change in temperature (dT/dt) and pressure (dP/dt) per unit time, as shown in FIGS. 3 and 4. The value of the dT/dt term (rate of change in temperature) stays relatively close to zero until the system runs liquid dry, where that term spikes substantially, as shown in FIG. 3 (between 2500 and 3000 minutes). As the system continues to run and the tube temperature (T) approaches the ambient temperature ($T_a$), the value of the dT/dt term gradually begins to fall back to zero. The dP/dt term (rate of change in pressure) also changes dramatically when the system runs liquid dry, only in the other direction, as shown in FIG. 4 (between 2500 and 3000 minutes). Since the pressure (P) falls more sharply when the system is liquid dry, the dP/dt term becomes more negative in value. It is noted that these changes (i.e., the spikes in dT/dt and dP/dt) occur at the same time.

Using a data logging device, a liquid dry condition in a tube (22 or 24) can be identified by a sudden increase in dT/dt with a simultaneous sudden decrease in dP/dt. It is important to consider common conditions that may either indicate a false liquid dry signal or cause a Programmed Logic Controller (PLC) (16) to fail to detect a true liquid dry signal according to the criteria discussed above. (It would be desirable to use a PLC to direct the changing of tubes in a tube trailer (18) or other bulk delivery system in an optimal manner.)

In the case of a no flow condition, the model consistently predicts that the system will see a slow increase in both pressure (P) and temperature (T) due to the warming effect on the tube. This will result in an increase of both dT/dt and dP/dt, and therefore, should not cause any problems. On the other hand, a sudden surge of flow will have the opposite effect, namely to show a decrease of both dT/dt and dP/dt. Again, this condition poses no problems for the PLC.

Since changing weather conditions may present a problem, ambient temperature ($T_a$) also should be monitored. If a cold front causes a dramatic and sudden drop in ambient temperature (30° F. or more) at the precise time that a tube goes liquid dry, this would wash out the spike in dT/dt. The sudden decrease in dP/dt, however, would become more pronounced. On the other hand, a sudden increase in ambient temperature at the precise time that a tube goes liquid dry may wash out the sudden decrease in dP/dt, but would amplify the spike in dT/dt. While these conditions may be abnormal, they must be accounted for when programming the logic for tube change over (or crossover).

Any mid range PLC with basic mathematical functionality will be able to perform this task. The processor will have a floating point mathematical capability. The PLC will sample pressure (P) and temperature (T) in the tube and ambient temperature ($T_a$) in an interval of a fixed time (e.g., milliseconds). (As previously discussed, signals indicative of P, T, and $T_a$ may be received by the PLC from the first, second, and third sensors.) The PLC then will calculate the change in pressure over time $\Delta P_t$, the change in temperature over time $\Delta T_t$, and the change in ambient temperature $\Delta T_a$ over time. In the next step, the PLC will calculate $$\frac{\Delta P_t}{\Delta t_t}$$

and $$\frac{\Delta T_t}{\Delta t_t}$$

(where $\Delta t_t$ is the interval of time) and subsequently will calculate $$\frac{\Delta P_t}{\Delta T_t}.$$

It will compare the value of $$\frac{\Delta P_t}{\Delta T_t}$$

with a preset range of values referring to the normal running conditions. If the $$\frac{\Delta P_t}{\Delta T_t}$$

value is out of range, then the PLC will calculate $$\frac{\Delta T_t}{\Delta T_a}$$

and $$\frac{\Delta P_t}{\Delta T_a}$$

and compare them with another preset range of values for normal running conditions. If these values also are out of range, then this whole procedure will be repeated several times on a very close time interval before reaching the conclusion as to whether $T_a$ is the root cause for these deviations or an actual liquid dry condition has occurred.

The present invention also provides an alarm feature to report by alarm the condition of liquid dry point. The alarm may be an audible siren, a visual light, a report on a computer system, or any combination of these types of alarms.

In conclusion, the process model indicates that the liquid dry point can be detected reliably by measuring system pressures (P) and temperatures (T). The point at which a system becomes liquid dry is manifested by detectable trends in dT/dt and dP/dt that exist in the moments immediately after an HCl tube has gone liquid dry, especially for systems with very high flow rates. These trends are subject to ambient temperature conditions, but may be predicted for a given set of circumstances.

Various embodiments of the present invention have been described above. However, it will be appreciated that variations and modifications may be made to those embodiments within the scope of the appended claims.

What is claimed is:

1. A transport vehicle for delivering a high-purity industrial liquefied compressed gas in gaseous phase, the vehicle being of the type having multiple tubes which contain the liquefied compressed ups having an apparatus for detecting an occurrence of a liquid dry condition in said tubes containing a liquefied compressed gas while the liquefied gaseous phase of the compressed gas is being removed from said tubes over time, comprising:
   a first sensor for sensing temperature (T) inside said tubes and for providing a signal indicative thereof;
   a second sensor for sensing pressure (P) inside said tubes and for providing a signal indicative thereof; and
   a computer for receiving signals from the first and second sensors, determining rates of change in the pressure (dP/dt) and the temperature (dT/dt) inside over time, and identifying an occurrence of a sudden increase in the rate of change in the temperature (dT/dt) inside said tubes and a substantially simultaneous occurrence of a sudden decrease in the rate of change in the pressure (dP/dt) inside said tubes, said substantially simultaneous occurrences indicating an occurrence of a liquid dry condition in said tubes.

2. An apparatus for detecting an occurrence of a liquid dry condition in said tubes as in claim 1, wherein the computer is a programmed logic controller.

3. An apparatus for detecting an occurrence of a liquid dry condition in said tubes as in claim 1, further comprising:
   a third sensor for sensing ambient temperature ($T_a$) and for providing a signal indicative thereof; and
   wherein the computer receives the signal from the third sensor and accounts for a change in the ambient temperature in determining the rate of change in the temperature (dT/dt) inside said tubes over time.

4. An apparatus for detecting an occurrence of a liquid dry condition in said tubes as in claim 1, further comprising:
   a data logging device for receiving the signals from the first and second sensors, converting said signals to measurements of pressure (P) and temperature (T) inside said tubes at specific points in time, determining rates of change in the pressure (dP/dT) and the temperature (dT/dt) inside said tubes over time, and recording the measurements of pressure (P), temperature (T), and rates of change in the pressure (dP/dt) and the temperature (dT/dt) inside said tubes as a function of time.

5. An apparatus for detecting an occurrence of a liquid dry condition in said tubes as in claim 3, further comprising:
   a data logging device for receiving the signals from the first, second and third sensors, converting said signals to measurements of pressure (P) and temperature (T) inside and ambient temperature ($T_a$) at specific points in time, determining rates of change in the pressure (dP/dT) and the temperature (dT/dt) inside over time, and recording the measurements of pressure (P), temperature (T), ambient temperature ($T_a$), and rates of change in the pressure (dP/dt) and the temperature (dT/dt) inside said tubes as a function of time.

6. An apparatus for detecting an occurrence of a liquid dry condition in at least one of the tubes as in claim 1, further comprising an alarm to report the occurrence of a liquid dry condition.

7. An apparatus for detecting an occurrence of a liquid dry condition in at least one of the tubes as in claim 1, wherein the first sensor is a thermocouple.

8. An apparatus for detecting an occurrence of a liquid dry condition in at least one of the tubes as in claim 1, wherein the second sensor is a pressure transducer.

9. A transport vehicle for delivering a high-purity industrial liquefied compressed gas in gaseous phase, the vehicle being of the type having multiple tubes which contain the liquefied compressed gas having an apparatus for detecting an occurrence of a liquid dry condition in at least one of the tubes containing a liquefied compressed gas while the gaseous phase of the liquefied compressed gas is being removed from at least one of the tubes over time, comprising:
   means for measuring pressure (P) inside at least one of the tubes over time;
   means for measuring temperature (T) inside at least one of the tubes over time;
   means for determining a rate of change in the pressure (dP/dt) inside at least one of the tubes over time;
   means for determining a rate of change in the temperature (dT/dt) inside at least one of the tubes over time; and
   means for identifying an occurrence of a sudden increase in the rate of change in the temperature (dT/dt) inside at least one of the tubes and a substantially simultaneous occurrence of a sudden decrease in the rate of change in the pressure (dP/dt) inside at least one of the tubes, said substantially simultaneous occurrences indicating an occurrence of a liquid dry condition in at least one of the tubes.

10. An apparatus for detecting an occurrence of a liquid dry condition in at least one of the tubes as in claim 9, further comprising:
    means for monitoring ambient temperature ($T_a$); and
    means for accounting for a change in the ambient temperature in determining the rate of change in the temperature (dT/dt) inside the at least one of the tubes over time.

11. A transport vehicle for delivering a high-purity industrial liquefied compressed gas in gaseous phase, the vehicle being of the type having multiple tubes which contain the liquefied compressed gas having an apparatus for directing a crossover to a second supply of liquefied compressed gas upon an occurrence of a liquid dry condition in at least one of the tubes containing a first supply of a liquefied compressed gas while the gaseous phase of the first supply of liquefied compressed gas is being removed from the at least one of the tubes over time, comprising:

means for measuring pressure (P) inside the at least one of the tubes over time;

means for measuring temperature (T) inside the at least one of the tubes over time;

means for determining a rate of change in the pressure (dP/dt) inside the at least one of the tubes over time;

means for determining a rate of change in the temperature (dT/dt) inside the at least one of the tubes over time;

means for identifying an occurrence of a sudden increase in the rate of change in the temperature (dT/dt) inside the at least one of the tubes and a substantially simultaneous occurrence of a sudden decrease in the rate of change in the pressure (dP/dt) inside the at least one of the tubes, said substantially simultaneous occurrences indicating an occurrence of a liquid dry condition in the at least one of the tubes; and means for actuating a crossover to the second supply of liquefied compressed gas upon identifying an occurrence of a sudden increase in the rate of change in the temperature (dT/dt) inside the at least one of the tubes and a substantially simultaneous occurrence of a sudden decrease in the rate of change in the pressure (dP/dt) inside the at least one of the tubes.

12. An apparatus for directing a crossover to a second supply of liquefied compressed gas upon an occurrence of a liquid dry condition in at least one of the tubes containing a first supply of a liquefied compressed gas as in claim 11, further comprising:

means for monitoring the ambient temperature ($T_a$); and means for accounting for a change in the ambient temperature in determining the rate of change in the temperature (dT/dt) inside the at least one of the tubes over time.

* * * * *